United States Patent
Castellucci et al.

[11] Patent Number: 5,429,772
[45] Date of Patent: Jul. 4, 1995

[54] POLYTHIOETHER-SPHERICAL FILLER COMPOSITIONS

[75] Inventors: Nicholas T. Castellucci, San Pedro; Roger M. Heitz, Palos Verdes Estates, both of Calif.

[73] Assignee: Northrop Grumman Corporation, Los Angeles, Calif.

[21] Appl. No.: 155,312

[22] Filed: Nov. 19, 1993

[51] Int. Cl.⁶ .................. C08G 75/00; C23C 16/00
[52] U.S. Cl. ....................... 252/514; 252/511; 252/518; 252/520; 428/402
[58] Field of Search ............ 252/511, 514, 518, 520; 428/402

[56] References Cited

U.S. PATENT DOCUMENTS

| | | | |
|---|---|---|---|
| 4,366,307 | 12/1982 | Singh et al. | 528/373 |
| 4,419,279 | 12/1983 | Abrams | 252/514 |
| 4,624,865 | 11/1986 | Gindrup et al. | 427/126.2 |
| 4,818,607 | 4/1989 | Rickborn et al. | 428/323 |
| 5,206,285 | 4/1993 | Castellucci | 524/588 |

*Primary Examiner*—Melvyn I. Marquis
*Assistant Examiner*—Helen F. Lee
*Attorney, Agent, or Firm*—Terry J. Anderson; Karl J. Hoch, Jr.

[57] ABSTRACT

A gap-fill or caulking composition, comprising one or more fluid polythioether polymers having reactive terminal groups, blended with hollow spheres coated with an inert electroconductive metal or metal nitride, which provide excellent chemical bonding with graphite composite surfaces, aluminum surfaces, including composite aluminum surfaces, and with epoxy, polyurethane, and acrylic primed surfaces.

16 Claims, No Drawings

POLYTHIOETHER-SPHERICAL FILLER COMPOSITIONS

BACKGROUND OF THE INVENTION

1. Field of the Invention

The present invention relates to novel polythioether/filler compositions in which the polythioether is a liquid which is curable at room temperature to form an elastomer having terminal groups which chemically bond to metallic surfaces such as aluminum alloy and aluminum composite surfaces, and/or to epoxy primer coatings applied to such surfaces. Such compositions are well suited for use in filling gaps, cracks or other narrow spaces in metallic, polymeric, composite and/or epoxy, polyurethane, or acrylic-primed surfaces since they are light in weight, they bond to such surfaces during curing at room temperatures as well as at elevated temperatures, they provide improved filler properties at very low temperatures, and they form smooth rubbery deposits having excellent water resistance and corrosion resistance, expansion-and-contraction properties and resistance to cracking.

2. Discussion of the Known Art

Reference is made to U.S. Pat. No. 4,366,307, the disclosure of which is incorporated by reference, for its disclosure of polythioether/filler compositions in which the polythioether is a liquid polymer which is curable at room temperature to form an elastomer having terminal vulcanizable or reactive groups such as silyl, hydroxy, alkoxy, mercapto and/or other reactive groups. The compositions of the Patent can contain amounts of filler, such as carbon-black, and are disclosed for use as water-, solvent-, fuel- and temperature-resistant sealants.

Various other polythioether liquid polymers are known which are curable at room temperatures to form rubbery solids which can contain fillers as colorants, conductivity particles, etc. While such compositions display better adhesive properties for metallic surfaces and better resistance to cracking than other gap-filling or caulking compositions, such as those based upon polyurethanes, silicone sealing polymers or other conventional binder materials used in caulking and gap-filling compositions, they present problems with respect to their use as binder materials for electroconductive fillers in gap-filler compositions.

Conventional polythioether/conductive filler compositions contain metallic powders, particles, or flakes, such as of nickel, to render the cured compositions electroconductive and heat-conductive. However, such metal particles, powders, and flakes render the gap-filler composition non-flowable or so slowly-flowable when used in the amounts necessary to impart sufficient conductivity, that the composition does not level when applied to cracks and gaps, such as over metal or composite surfaces, prior to solidification. This necessitates the additional step of sanding the gap or crack fill areas to render them level or coplanar with the surface areas.

In addition, the sanding of such composition is so hazardous to the health, due to the possible inhalation of the metal-containing dust, as to be prohibited by many safety regulatory agencies or to be permitted only with the use of masks or ventilation equipment.

SUMMARY OF THE INVENTION

The present invention relates to the discovery that curable, fluid polythioether gap fill or caulking compositions having excellent conductivity properties and excellent levelling properties can be produced by incorporating, as the conductive filler, metal-coated spheres having particle sizes between about 30 and 50 microns in diameter, most preferably between about 37 and 44 microns in diameter.

The metal coating on the spheres comprises an inert noble metal, such as silver or gold or an inert metallic compound, such as hafnium nitride or titanium nitride, applied as a thin surface coating by vacuum metalization or sputter-deposit techniques, as disclosed herein. The spherical configuration of the metal-coated filler particles imparts flow characteristics to the composition, even when present in large amounts, whereby the leveling properties permit the present gap fill compositions to flow and level in a gap before the composition cures and solidifies at room temperature.

Moreover, the presence of the conductive coating as a thin surface deposit on the supporting spheres substantially reduces the amount of metal required by about 35–40% which, in the case of noble metals, substantially reduces the overall cost and weight. The metal coating must be oxidation-resistant and non-reactive with the liquid polymer, particularly the terminal groups thereof.

DETAILED DESCRIPTION

The present compositions comprise a liquid polyether polymer having reactive terminal groups, and which is curable at room temperature to form a rubbery solid elastomer, and a major amount by weight of an electroconductive metallized sphere filler material, and minor amounts of a curing agent.

Preferred polythioether polymers comprise the following structures:

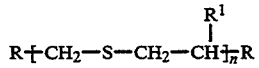

or

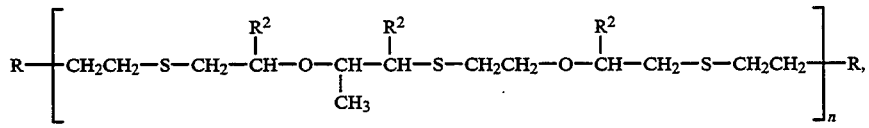

in which R is a same or different radical selected from the group consisting of —OH, —SH and —Si(OCH$_3$)$_3$, R$^1$ is a radical selected from the group consisting of —H, —Si(OH)$_3$, —Si(OCH$_3$)$_3$, —Si(OH)$_2$—CH=CH$_2$,

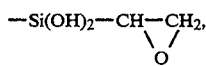

—OCH$_3$, and —OC$_n$H$_{2n+1}$, and R$^2$ is a same or different radical selected from the group consisting of —H, —OH, —OR, —NO$_2$, —SO$_2$—OH, —PO$_2$—OH, —COOH, —COOCH$_3$,

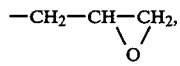

—phenyl, —substituted phenyl, —halogen, —COCH$_2$COCH$_3$, —COCH$_3$, —(CH$_2$)$_n$—CH$_3$, and —O—(CH$_2$)$_n$CH$_3$, in which n=1 to 18.

The metallized spheres suitable for use according to the present invention comprise a solid or hollow non-conductive core of a refractory material such as a glass or a refractory oxide material, or a plastic polymer, coated in appropriate manner with a thin, inert conductive metallic layer such as of silver, gold, hafnium nitride, titanium nitride, or other suitable non-reactive or non-oxidizing conductors. Suitable spheres are those having a diameter between about 30 and 90 microns, most preferably between about 37 and 44 microns.

Reference is made to U.S. Pat. Nos. 4,419,279 (Abrahms) and 4,624,865 (Gindrup et al.) for their disclosures of the production of metal-coated electroconductive glass and refractory filler spheres or microballoons which are suitable for use according to the present invention, such as Q-Cel 600 microspheres (PQ Corporation, Valley Forge, Pa.), provided that they have the necessary sphere sizes.

Reference is also made to commonly-assigned U.S. Pat. No. 4,818,607 for its disclosure of hollow fused silica spheres (Eccospheres) available in diameters between about 10 and 300 μ. Eccospheres having a diameter within the range of 30 to 50 μ, most preferably between about 37 and 44 microns, are suitable for use according to the present invention provided that they are coated with a thin, inert, noble metal or inert metallic compound coating such as by vacuum metallization, plasma sputtering, electroless plating or other known methods.

The use of hollow refractory microspheres is preferred since they have a much lower density and weight than conventional conductive metal fillers, such as nickel powder or silver powder, and they contain substantially smaller amounts by weight of the inert conductive metal which, in the case of noble metals such as silver and gold, substantially reduces the cost of the present fillers as compared to the solid particles of such noble metals.

Also, substantially larger amounts by volume of the present fillers can be used, as compared to solid metal filler particles while still resulting in a flowable fill composition having good levelling properties. This applies to spheres based upon polymeric materials as well as those based upon refractory materials.

The following examples are given by way of illustration of the preparation of curable gap fill compositions according to the present invention:

| Ingredients (Part A) | % by wt. |
| --- | --- |
| Diethyltoluenediamine | 15 |
| 1-Methoxy-2-Propanol Acetate | 85 |
| Ingredients (Part B) | |
| Hydroxyl Terminated Polythioether Polymer | 80 |
| Methylene bis (4-cyclohexyl isocyanate) | 5 |
| 1-Methoxy-2-Propanol Acetate | 15 |

Mix Part A and Part B by weight 90:100 respectively.
Cure Time
  At 77° F.:
    Partial cure (cure to handle)—24 hours
    Full cure (coating thickness 0.020")—14 days
    Full cure (coating thickness 0.050")—28 days
  Fast cure:
    Cure at 77° F. (24 hours), then at 140° F. (7 days) for full cure ( coating thickness 0.100")

Example 2

| Ingredients (Part A) | % by wt. |
| --- | --- |
| Diethyltoluenediamine | 10 |
| 1-Methoxy-2-Propanol Acetate | 90 |
| Ingredients (Part B) | |
| Hydroxyl Terminated Polythioether Polymer | 80 |
| Methylene bis (4-cyclohexyl isocyanate) | 5 |
| 1-Methoxy-2-Propanol Acetate | 15 |

Mix Part A and Part B by weight 90:100 respectively.
Cure Time
  At 77° F.:
    Partial cure (cure to handle)—24 hours
    Full cure (coating thickness 0.020")—14 days
    Full cure (coating thickness 0.050")—28 days
  Fast cure:
    Cure at 77° F. (24 hours), then at 140° F. (7 days) for full cure (coating thickness 0.100")

EXAMPLE 3

| Ingredients (Part A) | % by WT. |
| --- | --- |
| Alkoxysilane Terminated Polythioether Polymer (Permarol P3-201) | 85 |
| Methanol | 15 |
| Ingredients (Part B - Curing Agent) | |
| Organofunctional Silane A-1120 | 60 |
| Dibutyltin Diacetate | 40 |

Mix Part A and Part B by weight 98:2 respectively.
Cure Time
  At 77° F.:
    Full cure (coating thickness 0.100")—6 hours Strong bonds to an aluminum substrate and composite substrate are obtained with the Example 1, 2 and 3 compositions. These bonds are stronger than with mercaptan terminated polythioethers. The bond strength is further improved by using primers containing hydroxyl groups, in the case of the Example 1 and 2 compositions, and silyl groups in the case of the composition of Example 3. The bonding between the substrate and the hydroxyl-terminated polythioether is believed to take place by a dehydration reaction between the hydroxide moiety of the metal (or composite) and the hydroxyl group of the polythioether. In the case of silyl-terminated polythioethers, the bonding between the substrates and the silyl groups is believed to take place by a dealcoholization reaction between the hydroxide moiety of the metal (or composite) and the trimethoxysilane groups of the polythioether of Example 3. It has a better resistance to high and low temperatures than the hydroxyl-terminated polythioethers. It reduces or eliminates cracking, particularly at the low temperatures.

The polythioether polymers of Examples 1, 2 and 3 are prepared as in U.S. Pat. No. #4,366,307. The goal of the present invention is to obtain a highly conductive polymer when loaded with conductive fillers. The present conductive polymer compositions have a very good adhesion, cohesion, flexibility, fast cure at ambient temperature, very good low temperature (down to −65° F.) properties, very good conductivity, resistance to moisture take-up, reduced weight which provides easy handling and which are non-hazardous.

To achieve the desired conductivity the polymers are blended with hollow microspheres coated with inert conductive metals and metal nitrides such as Au, Ag, HfN, TiN, and other similar metals and metal nitrides. The Ag-coated glass hollow microspheres with nominal diameters ranging from roughly 20 to 100 microns were bought on the market and the Au-coated glass hollow microspheres were prepared from uncoated hollow microspheres. The uncoated glass hollow microspheres were also bought on the market (Q-Cel 600) with nominal diameters ranging from roughly 30 to 90 microns.

In the coating of glass hollow microspheres it was found that the principal difficulty inherent in the coating of spheres, using vacuum techniques intended for coating roughly planar substrates, is the lack of a means for agitation or turning of the substrate during deposition to achieve uniformity of coverage. This operation is commonly called "fluidization." The vacuum coating environment, by its very nature, precludes the use of flowing gas as a fluidization mechanism.

An alternate approach applicable to this environment uses low frequency (3200 -3500 Hz) mechanical vibration of a substrate container inside the coating chamber. The mechanism providing agitation is an encapsulated motor placed inside the vacuum system and cooled by forced airflow. The coating of the glass hollow microspheres (Q-Cel-600) by using the system described was quite successful, as judged by optical microscopy, although the material showed some tendency toward aggregation and packing during the coating process.

To uniformly coat fine grain particulate materials under vacuum, a rotating magnetic motor is attached to a vessel containing the particulate material to be coated. The vessel is tilted at a 35° F. to 65° angle and driven through a slanted glass box to provide rotation and subsequent tumbling of the particles. The action provides the required exposure of the particulates to the sputtered target and a more uniform coating of the particles will be obtained.

Initial experiments indicated a need for a quantitative measurement of the resistivity of the aggregate of coated microspheres. Since particle size distribution is a very significant parameter governing packing density of spheres, the effect of this parameter upon coatability required investigation. To accomplish this, the Q-Cel 600 material was separated into various size fractions by screening and coated with gold by the above sputtering process. The size ranges chosen are listed in Table 1, along with the sputtering powers, sputtering times, final weight of coated material and resistivity of the aggregate.

TABLE 1

Size fractions, sputtering parameters, and results for Au-coated Q-Cel 600 microspheres.

| SIZE RANGE (MICRONS) | SPUTTER POWER (WATTS) | SPUTTER TIME (HOURS) | COATED WT. (GRAMS) | RESISTIVITY (ohm cm) | COMMENTS |
|---|---|---|---|---|---|
| 30–90 (all) | 500 | 6.0 | 10.84 | 0.2 | packing; aggregation |
| <37 | 600 | 5.5 | 13.72 | 0.1 | packing; aggregation |
| 37–44 | 600 | 3.0 | 12.62 | 0.1 | good fluidization |
| 45–74 | 500 | 8.0 | 15.57 | 0.1 | bad packing; aggregation |
| >75 | 500 | 3.0 | 11.04 | 0.1 | good fluidization |

As shown in the above Table 1, which presents measurement data for unblended microspheres stacked in a glass cylinder, the dependency of these results upon size distribution becomes clear. For size ranges of 30 microns or greater, the required coating times are typically 6 to 8 hours. The only exceptions to this observation are the size ranges of 37–44 and >75 microns. For these two size ranges the coating time is 3 hours and complete fluidization is much more easily achieved. The coating times were for test quantities of the order of 10 grams.

For each size range given in Table 1, 2"×2"×⅛ test samples were prepared. The Au-coated microspheres were blended with the polymers of Examples 1, 2 and 3, using about 31% by weight of the Au-coated microspheres. When cured, the resistivity was measured. The best result was obtained for samples made from microspheres in the size range 37–44 microns. The surface resistivity for that size range was 0.1 ohm cm.

The 37–44 micron size range is preferred over the >75 micron size range. Although the unblended microspheres in those size ranges have generally identical properties (sputter time, resistivity, and fluidization), the test samples made with microspheres in the >75 micron size range had substantially higher resistivity than test samples made with the 37–44 micron size range. It is believed that the packing density of the larger microsphere size impairs electrical contact among the blended microspheres, producing a higher resistivity.

Similar tests were accomplished on test samples of Ag-coated microspheres. Readily available Ag-coated glass hollow microspheres, with nominal diameters ranging from roughly 20 to 100 microns, were separated into various size fractions by screening. The separation procedure is similar to the separation procedure used for the separation of uncoated Q-Cel 600 glass hollow microspheres. As discussed above, of the size ranges obtained, it was found that the best result are obtained with the size range 37–44 microns, where the measured resistivity of test samples was found to be 0.1 ohm-cm.

In a comparative performance evaluation, the efficiency of the filler-loaded polymer of Example 1 was compared with the efficiency of a filler loaded mercaptan-terminated polythioether. The mercaptan-terminated polythioether was filled with solid nickel spheres (65–70% by weight), and the hydroxyl-terminated polymer of Example 1 was filled with the Ag-coated glass hollow microspheres (size range 37–44 microns, fill percentages by weight of between 10% and 50% as described below).

The Ni-filled mercaptan-terminated polythioether is hazardous and the handling is difficult because the content of Ni filler is high, making the uncured mixture hard to flow. Also sanding of the cured mixture to obtain a smooth surface produces Ni-containing dust which is unsafe. The loaded mercaptan polymer can only use Ni and Au as conductive fillers. Other metals such as Ag, HfN and TiN cannot be used because of the mercaptan (—SH) group which will chemically react with these metals. In comparison the Ag-loaded hydroxy-terminated polymer is safe, easy to handle in the uncured state, is not hazardous and the filler content is much lower than in the mercaptan-terminated polymer composition.

In the aforementioned performance tests, the polymer of Example 1 was filled with different quantities of Ag-coated hollow microspheres ranging from 10% to 50% by weight in 10% increments. To evaluate the characteristics of the filled material, focused microwave signals were directed at the filled polymer in a groove or gap formed by two metal plates. Because best results were obtained from the filled polymer compositions having 30% and 40% microsphere content by weight, a further sample having 35% microsphere filler by weight was also prepared. The lowest resistivity was obtained when the conductive microsphere content was 30–35% by weight. In comparison, mercaptan polymer filled with Ni (65–70% by weight) had a low resistivity (approximately 0.2 ohm-cm) but higher than the filled (30–35% by weight) hydroxyl-terminated polymer.

The filled polymers of Examples 1, 2 and 3 have been optimized to further reduce the curing time of the polymer at ambient temperature, improve adhesion, cohesion, flexibility, low and high temperature properties, resistivity, moisture take-up, reduce weight, and provide easy handling. In the case of the polymers of Examples 1 and 2, the most important property is the curing time at ambient temperature, which also affects the other properties mentioned above.

Certain of these improvements can be made by blending the polymers of Examples 1 and 2. The polymer of Example 1 has a low molecular weight and the polymer of Example 2 has a high molecular weight. It was found that a blending ratio of 50%–50% produced the optimum improvements. The conductive blends, after cure, have the strength of the polymer of Example 1 and the flexibility of the polymer of Example 2. Also, a low temperature plasticizer can be added to the filled polymers to increase the flexibility of the cured matrix, reduce the matrix shrinkage, lower the curing time at ambient temperature, and eliminate or reduce the large amount of solvent present in the polymers. Three plasticizers (HB-40—a hydrogenated terphenyl, Santicizer 278—a benzylphthalate, and Paroil 5510—a chlorinated paraffin oil) were tested. HB-40 and Santicizer 278 are available at the Monsanto Co. Paroil 5510 is available at the Dover Chemical Corporation. Also, selected curing agents can be used to further improve the cure times at ambient temperature.

In the case of the filled polymers of Example 3 (silyl terminated polythioether), improvement efforts concentrated on the high and low temperature properties (—45° F. to 65° F.) area was mostly concentrated on. Introducing more silyl groups in the polythioether molecule enhances this property. The polymer of Example 3, using an appropriate curing agent, will, for instance, fully cure at ambient temperature in 10 to 20 hours. The curing time can be further reduced by varying the polymer curing agent ratio. The curing agent used is a two component curing agent. The silane is a Union Carbide Organofunctional Silane A-1120 (N-beta-(aminoethyl)-gamma-aminopropyltrimethoxysilane) and the tin catalyst is Metacure T-1 Catalyst from Air Products and Chemicals, Inc. (Dibutyldiacetoxy stannate or Dibutyltin diacetate).

The present gap-fill or caulking composition, comprising one or more polythioether polymers having reactive terminal groups blended with hollow spheres coated with an inert electroconductive metal, provide excellent chemical bonding with graphite composite surfaces, aluminum surfaces, including composite aluminum surfaces, and with epoxy-primed surfaces, due to the reactivity of the reactive terminal R groups of the polymer, the reactive $R^1$ or $R^2$ side groups, such as epoxide groups, with the hydroxyl groups present at the aluminum surface. The strongest bonding is provided with the hydroxylated aluminum surfaces when the reactive terminal groups are trimethoxy silane groups, in which case bonding occurs by a dealcoholization reaction with the release of methanol. Good bonding is also obtained when the reactive terminal groups are hydroxyl groups, in which case bonding occurs by a dehydration reaction. Somewhat weaker bonding occurs when the reactive terminal groups are mercapto groups.

In cases where the aluminum surface or the composite aluminum/carbon surface is primed before application of the present gap-fill compositions, the primer preferably comprises a resinous material having groups which are reactive with the hydroxylated aluminum surface and with the reactive terminal groups of the polythioether polymer, such as an epoxide resin.

Reference is made to commonly-assigned U.S. Pat. No. 5,206,285, hereby incorporated by reference, for its disclosure of bonding mechanisms between hydroxylated aluminum surfaces and methoxy silane reactive terminal groups of polyether polymers, forming corrosion-resistant coatings bonded to such aluminum surfaces.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A fluid gap fill composition, comprising:
a liquid polythioether matrix having the structure

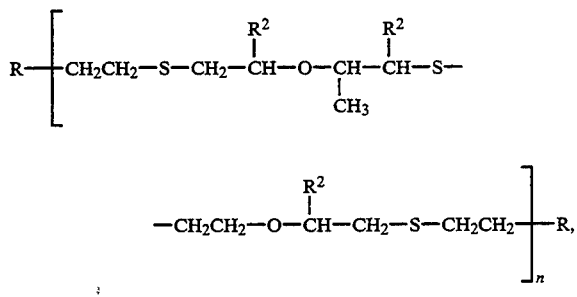

in which R is a same or different radical selected from the group consisting of —OH, —SH and —Si(OCH$_3$)$_3$, R$^2$ is a same or different radical selected from the group consisting of —H, —OH, —OR, —NO$_2$,

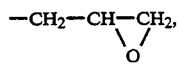

—phenyl, —substituted phenyl, —halogen, —COCH$_2$COCH$_3$, —COCH$_3$, —(CH$_2$)$_n$—CH$_3$, and —O—(CH$_2$)$_n$CH$_3$, and n is an integer from 1 to about 18; and,
an electroconductive filler comprising hollow spheres of a refractory material, each sphere having
a diameter of between about 30 microns and about 50 microns, and
an electroconductive surface layer sputter-deposited thereon, said surface layer being an electroconductive material selected from the group of electroconductive materials consisting of inert conductive metals and metal nitrides.

2. The fluid gap fill composition as claimed in claim 1, wherein the inert conductive metals comprise noble metals.

3. The fluid gap fill composition of claim 2 wherein the noble metals are silver and gold.

4. The fluid gap fill composition of claim 1 wherein the metal nitrides are hafnium nitride and titanium nitride.

5. The fluid gap fill composition of claim 1 wherein the diameter of each sphere is between about 37 microns and about 44 microns.

6. The fluid gap fill composition of claim 1 wherein the electroconductive filler comprises from about ten percent to about fifty percent by weight of the fluid gap fill composition.

7. The fluid gap fill composition of claim 1 wherein the electroconductive filler comprises from about thirty percent to about thirty-five percent be weight of the fluid gap fill composition.

8. The fluid gap fill composition of claim 1, wherein the liquid polythioether matrix comprises:
a first matrix polymer formed of
a first ingredient composed of about fifteen percent by weight of diethyltoluenediamine and about eighty-five percent by weight of 1-methoxy-2-propanol acetate; and,
a second ingredient composed of about eighty percent by weight of a hydroxyl-terminated polythioether polymer, about five percent by weight of 4-cyclohexyl isocyanate, and about fifteen percent by weight of 1-methoxy-2-propanol acetate,
the first and second ingredients being mixed in a proportion by weight of about 90 parts of the first ingredient to about 100 parts of the second ingredient, and
a second matrix polymer formed of
a third ingredient composed of about ten percent by weight of diethyltoluenediamine and about ninety percent by weight of 1-methoxy-2-propanol acetate; and,
a fourth ingredient composed of about eighty percent by weight of a hydroxyl-terminated polythioether polymer, about five percent by weight of 4-cyclohexyl isocyanate, and about fifteen percent by weight of 1-methoxy-2-propanol acetate,
the third and fourth ingredients being mixed in a proportion by weight of about 90 parts of the third ingredient to about 100 parts of the fourth ingredient.

9. The fluid gap fill composition of claim 8, wherein the first matrix polymer and the second matrix polymer are combined in substantially equal proportion by weight.

10. The fluid gap fill composition of claim 8 further comprising a plasticizing agent.

11. The fluid gap fill composition of claim 10 wherein the plasticizing agent is a plasticizing agent selected from the group of plasticizing agents consisting of a hydrogenated terphenyl, a benzylphthalate, and a chlorinated paraffin oil.

12. The fluid gap fill composition of claim 8 further comprising a curing agent.

13. The fluid gap fill composition of claim 1, wherein the liquid polythioether matrix comprises a third matrix polymer formed of
a fifth ingredient composed of about eighty-five percent by weight of an alkoxysilane terminated polythioether polymer and about fifteen percent by weight of methanol; and,
a curing agent composed of about sixty percent by weight of an organofunctional silane and about forty percent by weight of a thin catalyst,
the fifth ingredient and the curing agent being mixed in a proportion by weight of about 98 parts of the firth ingredient to about 2 parts of the curing agent.

14. The fluid gap fill composition of claim 13 wherein the organofunctional silane comprises N-beta(aminoethyl)-gamma-aminoproplyltrimethoxysilane.

15. The fluid gap fill composition of claim 13 wherein the tin catalyst is dibutyldiacetoxy stannate.

16. The fluid gap fill composition of claim 13 wherein the tin catalyst is dibutyltin diacetate.

* * * * *